United States Patent [19]

Spies

[11] 4,166,487

[45] Sep. 4, 1979

[54] DISPENSING AND MEASURING DEVICE

[76] Inventor: Henry J. Spies, Princeville at Hanalei, P.O. Box 206, Hanalei, Kauai, Hi. 96714

[21] Appl. No.: 731,349

[22] Filed: Oct. 12, 1976

[51] Int. Cl.² ............................................. G01F 11/10
[52] U.S. Cl. ..................................... 141/358; 222/306; 222/355; 73/429
[58] Field of Search ............... 141/358, 373, 346, 360, 141/362; 222/361, 355, 306, 366, 438, 440; 73/429

[56] References Cited

U.S. PATENT DOCUMENTS

| | | | |
|---|---|---|---|
| 177,211 | 5/1876 | Curran | 141/358 |
| 245,125 | 8/1881 | Brown | 141/358 X |
| 272,072 | 2/1883 | Michaelis | 73/429 X |
| 465,090 | 12/1891 | Willson | 141/358 |
| 674,168 | 5/1901 | Kinnard | 141/358 X |
| 731,577 | 6/1903 | Kinnard | 141/358 X |
| 954,782 | 4/1910 | Condon | 222/306 |
| 1,058,269 | 4/1913 | Spurlock | 222/361 |
| 1,419,338 | 6/1922 | Wieneke | 141/358 |
| 1,988,122 | 1/1935 | Horvaki | 141/358 |
| 2,775,270 | 12/1956 | McKillop | 141/373 |

FOREIGN PATENT DOCUMENTS

345469 5/1960 Switzerland .............................. 73/429

Primary Examiner—Robert J. Spar
Assistant Examiner—Frederick R. Handren
Attorney, Agent, or Firm—John E. Reilly; James R. Young

[57] ABSTRACT

A dispensing and measuring device for dry particulate matter includes a container having a downwardly discharging outlet therein and a guideway port extending transversely therethrough beneath the outlet. A measuring scoop having a tapered forward end is adapted for insertion into the guideway port so as to be positioned immediately beneath the discharge outlet. A spring-biased closure plate disposed within the guideway port immediately beneath the outlet is guided by a slide member between guide rails longitudinally on either side of the outlet so that the closure plate is movable longitudinally of the guideway port to open and close the outlet, return springs being connected to the closure plate to maintain the closure plate in a normally closed position beneath the outlet. A V-shaped shoulder member projects downwardly from the underside of the closure plate into the path of travel of the tapered forward end of the measuring scoop to cause the closure plate to move away from the outlet to permit discharge of the contents of the container into the measuring scoop. As the measuring scoop is removed from the guideway port, the return springs cause the closure plate to return to its closed position beneath the outlet thereby closing the outlet.

15 Claims, 6 Drawing Figures

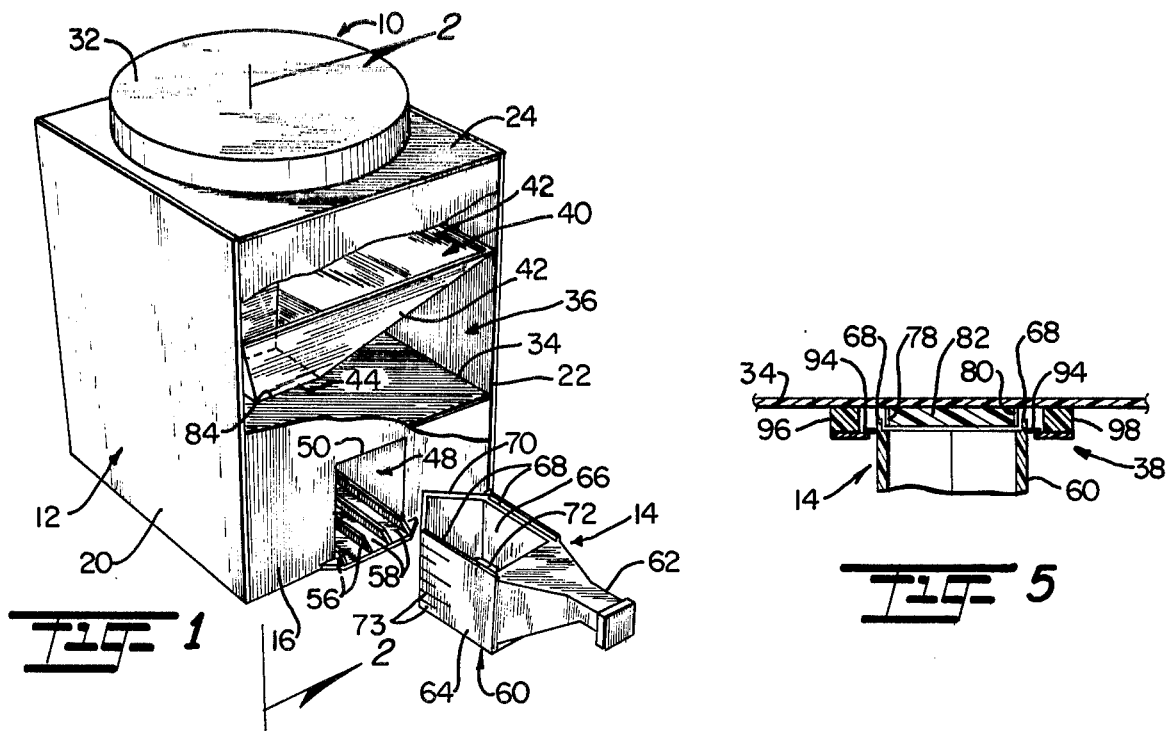
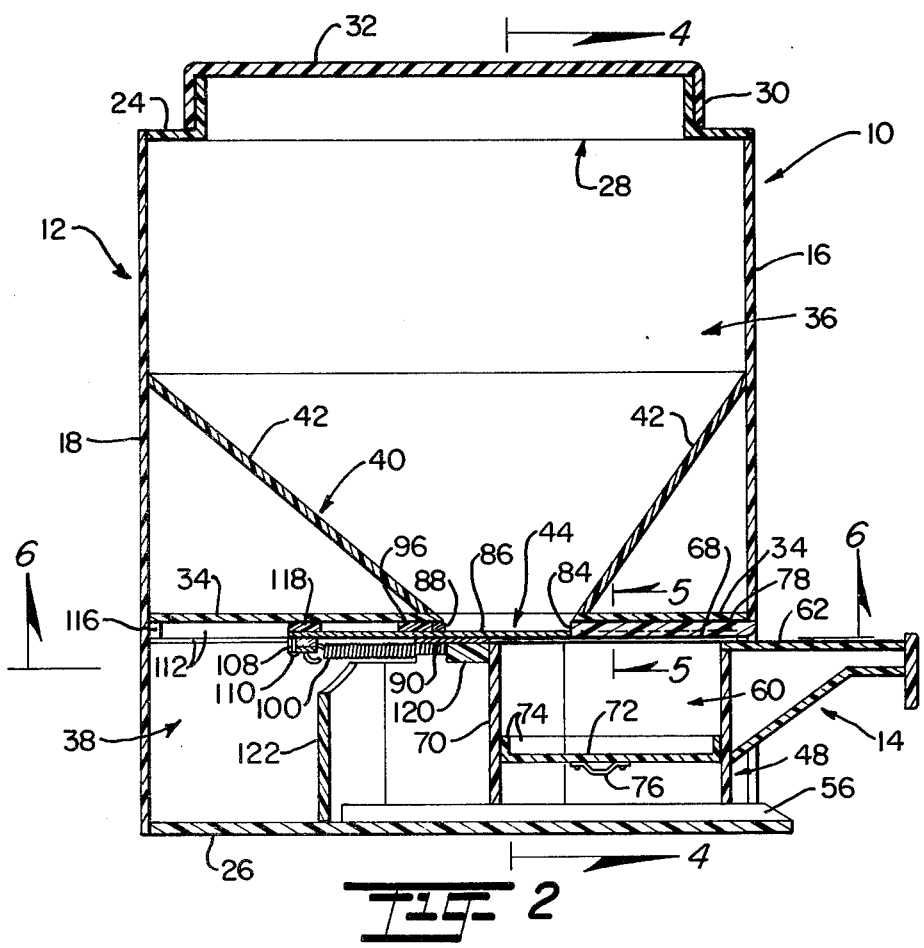

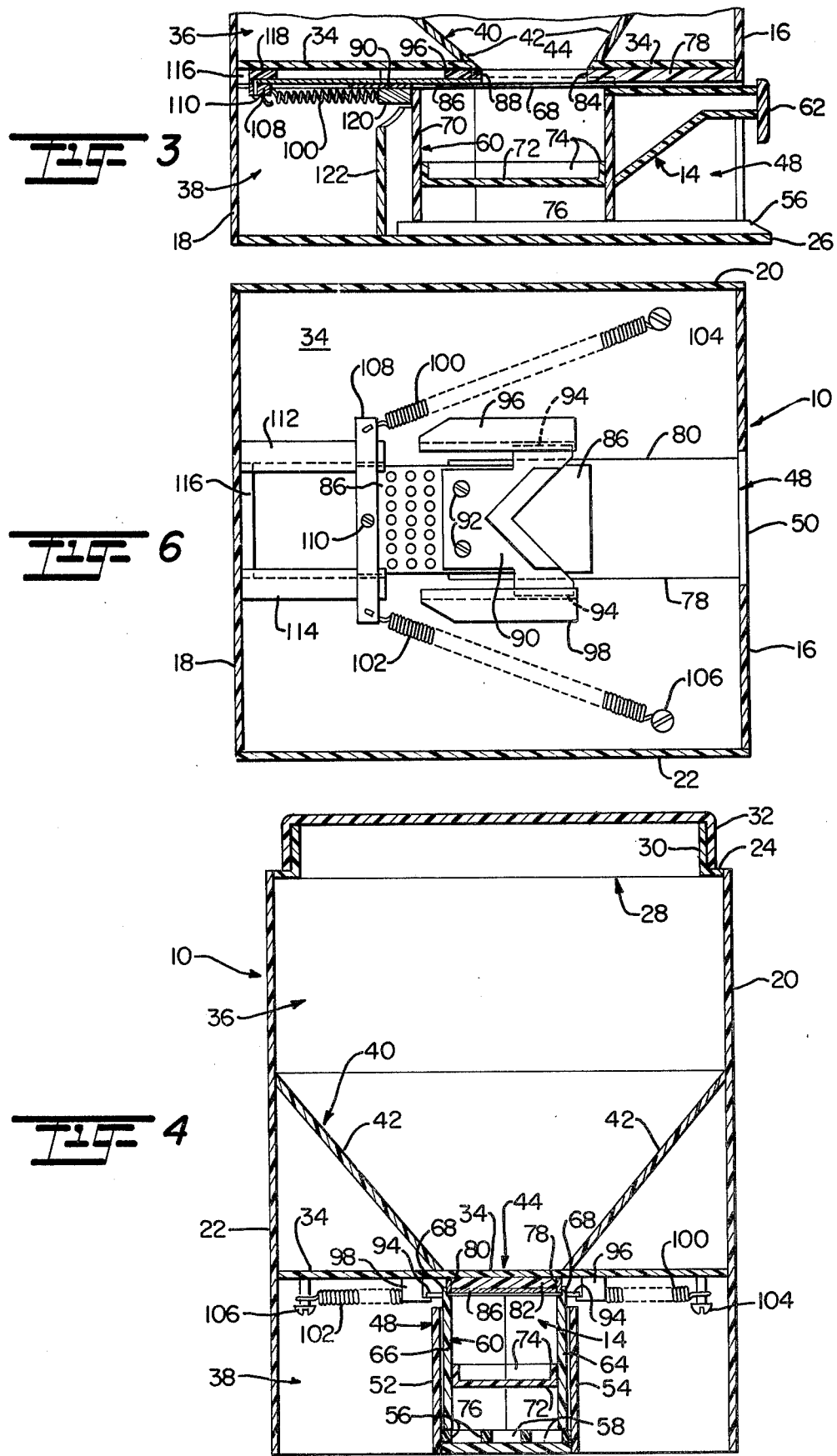

DISPENSING AND MEASURING DEVICE

BACKGROUND OF THE INVENTION

1. Field of the Invention

This invention relates to dispensing devices for dry particulate matter such as coffee, tea, sugar, condiments and the like, and more particularly to devices for dispensing such material in specific measured amounts. More particularly, the present invention relates to a dispensing and measuring device for such dry particulate material having an improved dispensing mechanism whereby variable amounts of material may be accurately dispensed while minimizing spillage of the material from the device during the dispensing process.

2. Description of the Prior Art

A variety of devices for dispensing measured amounts of dry particulate matter such as coffee, tea, sugar, condiments and the like are well known to the art. Many such devices include funnel-shaped containers for dispensing the particulate matter through an outlet therein into a measuring receptacle, as disclosed in U.S. Pat. No. 272,072, issued to O. E. Michaelis on Feb. 13, 1883, and U.S. Pat. No. 954,782, issued to J. R. Condon on Apr. 12, 1910. It is also common among such devices to include a slide closure of some type which closes and opens the discharge outlet of the container and is moved away from the outlet by insertion of the measuring receptacle into the container, thereby permitting discharge of the contents of the container into the measuring receptacle. U.S. Pat. No. 674,168, issued May 14, 1901 and U.S. Pat. No. 731,577, issued June 23, 1903, both to G. M. Kinnard, disclose such a funnel-shaped dispenser having a slide and closure plate mechanism disposed below the outlet of the dispenser along a slideway located beneath the dispenser. In addition, a measuring scoop is insertable into the slideway so as to move the closure plate from beneath the outlet to receive the contents of the dispenser, a gauge plate being used to regulate the amount of material being dispensed into the scoop each time the scoop is inserted into the slideway.

U.S. Pat. No. 177,211, issued to G. Curran on May 9, 1876, U.S. Pat. No. 1,419,338, issued to J. Wieneke on June 13, 1922, and U.S. Pat. No. 1,988,122, issued to M. Horkavi on Jan. 15, 1935, all disclose a dispensing and measuring device which includes a combination of a hopper having a discharge outlet and a sliding closure member normally maintained in a closed position beneath the outlet and which is movable from beneath the outlet by insertion of a scoop or receptacle into a slideway located below the outlet. Both the '338 and '122 patents disclose an abutment member or lug projecting downwardly from the bottom of the sliding closure member and which is engaged by the scoop to force the closure member away from the discharge outlet. The '122 patent further discloses an adjustable fitting on the sliding closure member which controls the distance which the slide member may be moved by the scoop thereby controlling the amount of material discharged through the outlet into the scoop. The '122 patent also teaches that the slide member is normally held in a closed position beneath the outlet by tension springs.

U.S. Pat. No. 245,125, issued to J. H. Brown on Aug. 2, 1881, discloses a dispensing and measuring device consisting of a sugar bowl or canister which has several slideways and scoops insertable therein to permit the opening of closure plates located below the outlets of funnel-shaped container disposed within the cannister or bowl. Each slideway has a spring-biased slide gate for closing and opening the outlet in the slideway by insertion or withdrawal of the scoop.

One particular problem with many of these prior art devices is that the amount of material discharged into the measuring receptacle or scoop is not adjustable, or if it is adjustable, the amount discharged is generally determined by the degree to which the outlet is opened when the measuring scoop is inserted into the device. This adjustment of the movement of the slide closure beneath the discharge outlet is burdensome and sometimes difficult due to the limited working space beneath the outlet. In addition, there is a tendency for many of such devices to become jammed or clogged and to spill material from the outlet into the slideway and slide closure mechanism when the scoop is inserted into and retrieved from the device, thereby wasting such material as well as interfering with the proper operation of the slide closure mechanism.

SUMMARY OF THE INVENTION

It is, therefore, a primary object of the present invention to provide an improved dispensing and measuring device for dry particulate matter such as coffee, tea, sugar, condiments and the like.

Another object of the present invention is to provide a dispensing and measuring device for dry particulate matter having an improved dispensing mechanism which minimizes jamming or clogging of the mechanism.

A further object of the present invention is to provide an improved dispensing and measuring device for dry particulate matter whereby spillage of the dispensed particulate matter is minimized, and accurately measured amounts of the particulate matter may be dispensed in preselected, variable quantities with relative ease.

In order to achieve these objects and in accordance with the present invention, a dispensing and measuring device includes a dispensing container divided by a partition plate into an upper chamber and a lower chamber. Disposed within the upper chamber is a hopper adapted for storing and discharging the particulate matter through a downwardly discharging outlet located in the partition plate. Extending transversely through the lower chamber beneath the hopper outlet is a guideway port having one open end located at the front of the container which acts as an access opening.

A spring-biased closure plate is located within the guideway port along a path immediately beneath the hopper outlet and functions to selectively close or open the outlet. The closure plate is normally in a closed position immediately beneath the outlet and opens the outlet to discharge the contents of the hopper by moving longitudinally along the guideway port. A slide member secured to the underside of the closure plate is engaged with substantially parallel guide rails located along the bottom surface of the container's partition plate on either side of the hopper outlet. In this manner, the slide member and guide rails support the closure plate and guide it longitudinally along the guideway port to open and close the outlet.

In the preferred embodiment, return springs are anchored at one end to the bottom surface of the partition plate and at the other end to the closure plate for movement therewith. The spiral springs maintain the closure plate in its normally closed position and urge the closure plate toward its closed position beneath the outlet after the closure plate has been moved forwardly along the guideway port to open the outlet.

A measuring scoop having an open top and an adjustable bottom to permit variance of the volume of the scoop is adapted for longitudinal movement within the guideway port along a path immediately below the closure plate. The forward end of the measuring scoop is tapered for engagement with a V-shaped shoulder member which projects downwardly from the underside of the closure plate. The shoulder member is preferably disposed directly below the hopper outlet when the closure plate is in its closed position. In this manner, when the measuring scoop is moved forwardly along the guideway port and engaged with the shoulder member, the scoop is located partially below the closed outlet. Further forward movement of the scoop along the guideway port forces the closure plate away from the outlet due to the engagement of the shoulder member with the scoop, thereby opening the outlet and allowing the contents of the hopper to be discharged into the scoop. In the preferred embodiment, a stop member is provided within the guideway port to prevent further forward movement of the measuring scoop once the closure plate has been moved away from the outlet to the extent that the outlet is completely open, the measuring scoop being of sufficient length and width to receive all of the contents discharged through the open outlet.

Upper scoop guide rails are provided on the bottom surface of the partition plate along either side of the outlet between the rearward edge of the outlet and the access opening to guide the measuring scoop along the guideway port. In addition, upwardly projecting flanges disposed along the upper longitudinal side edges of the measuring scoop are provided to engage the upper scoop guide rails to direct the scoop within the guideway port along a path immediately below the closure plate and the hopper outlet when the scoop is inserted or withdrawn from the guideway port.

A block or scraper member is disposed along the bottom surface of the partition plate between the upper scoop guide rails, the rearward edge of the hopper outlet, and the access opening. This block member extends downwardly from the bottom surface of the partition plate through the upwardly projecting flanges of the measuring scoop to provide a scraper surface at the rearward edge of the hopper outlet so that when the measuring scoop, filled with the contents of the hopper, is moved rearwardly along the guideway port, the block member scrapes off excess material at the top of the measuring scoop while the closure plate is being retracted to its closed position. This enables the measuring scoop to be completely filled, and prevents any spillage of excess material at the outlet when the measuring scoop is being withdrawn and the closure plate is being retracted. In addition, the adjustable bottom of the measuring scoop enables any preselected amount of material to be removed from the hopper merely by adjusting the bottom and volume of the measuring scoop.

BRIEF DESCRIPTION OF THE DRAWINGS

FIG. 1 is a front perspective, partially fragmentary view of the present invention with the measuring scoop located outside of the dispensing container.

FIG. 2 is a cross-sectional view of the present invention taken substantially along the plane of line 2—2 of FIG. 1 and illustrating the measuring scoop inserted within the guideway port of the dispensing container with the closure plate in its closed position.

FIG. 3 is a fragmentary cross-sectional view of the present invention similar to FIG. 2 but with the measuring scoop completely inserted within the guideway port and the closure plate in its open position.

FIG. 4 is a cross-sectional view of the present invention taken substantially along the plane of line 4—4 of FIG. 2.

FIG. 5 is a fragmentary cross-sectional view taken substantially along the plane of line 5—5 of FIG. 2 and illustrating the upper scoop guide rails and the closure plate guide rails in relation to the measuring scoop inserted within the guideway port of the present invention.

FIG. 6 is a bottom cross-sectional view taken substantially along the plane of line 6—6 of FIG. 2 and illustrating the dispensing mechanism of the present invention without the measuring scoop.

DETAILED DESCRIPTION OF THE PREFERRED EMBODIMENT

Referring to the Figures and particularly to FIG. 1, a dispensing and measuring device 10 includes a dispensing container 12 and a measuring scoop 14. The container 12 is preferably in the form of a box comprising a front panel 16, a back panel 18, side panels or plates 20 and 22, a top plate 24 and a bottom panel 26. The top plate 24 has an opening 28 disposed therein and which is preferably bounded by an upwardly projecting flange 30 about which a removable lid 32 is fitted. Dry particulate matter such as coffee, tea, sugar, condiments, or the like are fed through the opening 28 into the dispensing container 12 to be stored therein.

Disposed within the container 12 is a partition wall 34 which divides the container 12 into an upper chamber 36 and a lower chamber 38. Secured within the upper chamber 36 is a funnel-shaped hopper 40 having inclined sides 42 which converge downwardly from the upper portion of the chamber 36 to an outlet opening 44 located in the partition wall 34.

Extending through the front wall 16 of the lower chamber 38 of the container 12 is a guideway port 48. The guideway port 48 extends beneath the discharge outlet 44 and has an entrance 50 which acts as an access opening for the scoop 14. In the illustrated embodiment, the guideway port 48 is formed by the partition wall 34, the bottom panel 26 and in part by guideway walls 52 and 54. As illustrated, the guideway walls 52 and 54 extend along the guideway port 48 from the opening 50 to the forward edge 88 of the outlet 44. In the preferred embodiment, lower guide tracks or ribs 56 are spaced along the bottom surface of the guideway port 48 for guiding the scoop 14 along the guideway port 48. In addition, grooves 58 which are formed between the tracks 56 function to receive any spilled material so as not to interfere with the proper movement of the scoop 14 through the guideway port 48.

Turning now to the more detailed FIGS. 2 through 7, the scoop 14 includes an open-topped cup portion 60 and a handle 62. Longitudinal sides 64 and 66 of the cup portion 60 each have an upwardly projecting slide flange 68, and a forward nose 70 of the cup portion 60 is tapered as shown, for reasons more fully discussed below. Bottom wall 72 of the cup portion 60 is adjustable upwardly or downwardly within the cup portion 60 so as to selectively vary the volume of the cup portion 60 as readily determined by graduated measurement markings 73 located on the sides 64 and 66 of the cup portion 60. To maintain the bottom 72 in its desired position within the cup portion 60, up turned edges 74 are provided along the bottom 72 to frictionally engage the sides 64, 66, the front 70 and back wall 75 of the cup portion 60. A handle 76 is preferably provided on the bottom surface of the bottom 72 for easy adjustment of the volume of the cup portion 60.

The scoop 14 is sized and shaped for insertion through the entrance 50 into the guideway port 48 for longitudinal movement therewithin. To maintain the scoop 14 in close alignment with the upper surface of the guideway port 48, two substantially parallel, spaced-apart guide rails 78 and 80 are disposed on the bottom surface of the partition wall 34 between the access opening 50 and the discharge outlet 44 on either side of the outlet 44. The upwardly projecting flanges 68 of the cup portion 60 are guided by the outer edges of the guide rails 78 and 80, the sides 64 and 66 of the cup portion 60 being guided by the guideway walls 52 and 54, and the bottom of the scoop 14 being guided by the tracks 56 whereby the scoop 14 is guided within the guideway port 48 along a path beneath the outlet 44 with minimal misalignment or wobbling. This enables the scoop 14 to be brought immediately beneath the outlet 44 when the scoop 14 is inserted completely into the guideway port 48 which permits complete filling of the cup portion 60 with the contents of the hopper 40 while greatly minimizing any spillage of the material.

Furthermore, to minimize any spillage of the material from the hopper 40 during its discharge through outlet 44, a scraper block 82 is disposed between the upper scoop guide rails 78 and 80 and between the rearward edge 84 of the outlet 44 and the entrance 50. Once the scoop 14 has been filled from the outlet 44 and is removed from the guideway port 48, the rearward motion of the scoop 14 causes the scraper block 82 to scrape off any excess material at the rearward edge 84 of the outlet 44 as the scoop 14 passes therebeneath. The block 82 also packs the material within the cup portion 60 of the scoop 14 as the scoop 14 is removed from the guideway port 48.

With particular reference to FIGS. 6 and 7, to open and close the outlet 44 while minimizing spillage of the contents of the hopper 40, a closure plate 86 is disposed along the underside of the partition plate 34 along the guideway port 48 immediately below the discharge outlet 44. In the preferred form, the closure plate 86, when in its closed position beneath the outlet 44, underlies the scraper block 82 and the rearward edge 84 of the outlet 44 and extends longitudinally and forwardly along the guideway port 48 beyond the forward edge 88 of the outlet 44. To support the closure plate 86 in this position and to guide the closure plate 86 forwardly along the guideway port 48, a slide member 90 is secured to the underside of the closure plate 86 by bolts 92. The slide member 90 includes extended wing portions 94 engaged for sliding movement with substantially parallel, spaced-apart closure plate guide rails 96 and 98. The guide rails 96 and 98 are preferably disposed longitudinally along the bottom surface of the partition plate 34 on either side of the discharge outlet 44 and extend forwardly along the guideway port 48 from the outlet 44 toward the back plate 18 of the dispensing container.

To maintain the closure plate 86 in its closed position beneath the outlet 44 and to urge the closure plate 86 to its closed position when the plate 86 has been moved longitudinally along the guideway port 48 toward the back plate 18 away from the outlet 44 so as to open the outlet 44, two return springs 100 and 102 are secured at one end to the bottom of the partition plate 34 by bolts 104 and 106 which are located near the side plates 20 and 22 of the container 12 between the rearward edge 84 of the outlet 44 and the access opening 50 of the guideway port 48. The opposite ends of the springs 100 and 102 are secured to the ends of a transversely oriented mounting bracket 108 which is secured to the forward end of the closure plate 86 by a bolt 110. The mounting bracket 108 is adapted for movement with the closure plate 86 and is supported and guided, along with the forward end of the closure plate 86, by substantially parallel, spaced-apart spring guide rails 112 and 114, which are secured to the bottom surface of the partition plate 34 at the forward end of the guideway port 48 near the back plate 18 of the container 12. A stop support block 116 is provided along the back plate 18 to secure the springguide rails 112, 114 in place and to provide a stop for the forward movement of the closure plate 86. In addition, a slide block 118 is secured to the mounting bracket 108 by the bolt 110 to slidably mount the bracket 108 and the forward portion of the closure plate 86 to the guide rails 112 and 114.

To move the closure plate 86 away from its closed position beneath the outlet 44, a V-shaped shoulder member 120 projects downwardly from the underside of the closure plate 86 and is adapted for engagement by the tapered forward end 70 of the measuring scoop 14. The shoulder member 120 preferably is located immediately below the center of the outlet 44 when the closure plate 86 is in its closed position. In this manner, when the measuring scoop 14 is inserted into the guideway port 48, the forward end 70 of the scoop 14 engages the shoulder member 120, and further forward the movement along guideway port 48 by the scoop 14 forces the closure plate 86 to move forwardly therewith against the tension of the return springs 100 and 102. This movement of the closure plate 86 causes the outlet 44 to be opened thereby permitting the discharge by gravity of the contents of hopper 40 into the cup portion 60 of the scoop 14. Since the shoulder member 120 is located immediately below the center of the outler 44 when the closure plate 86 is in its closed position, the scoop 14 will be partially beneath the outlet 44 before the outlet 44 is open. The length of the cup portion 60 of the scoop 14 is such that when the closure plate 86 has been moved forwardly to completely open the outlet 44, the cup portion 60 of the scoop 14 is completely beneath the opened outlet 44. Due to the greater size of the cup portion 60 in relation to the size of the outlet 44 and the close proximity of the top of the cup portion 60 to the outlet 44 as well as the scraper 82 above the closure plate 86, spillage of the contents of the hopper 40 during discharge thereof through the outlet 44 into the cup portion 60 is greatly reduced. As mentioned previously, once the cup portion 60 has been filled and the scoop 14 is moved rearwardly along the guideway port 48, the scraper block 82 levels off and packs the material discharged into the cup portion 60 and thereby substantially prevents the material from spilling into the guideway port 48. As the scoop 14 is removed from the guideway port 48, the springs 100 and 102 move the closure plate 86 back toward its closed position so that the outlet 44 is completely closed prior to complete removal of the cup portion 60 from beneath the outlet 44. This also prevents any spillage of the material from the outlet 44 into the guideway port 48.

Since some spillage of the contents of hopper 40 may infrequently occur, a vertical tapered guideway member 122 is preferably disposed within the guideway port 48 between the outlet 44 and the back plate 18 of the container 12 and between the guideway walls 52 and 54. The guideway member 122 prevents any spilled material from dispersing into the remaining portions of the lower chamber 38 and may also, if desired, act as a stop member for the forward movement of the scoop 14.

In the preferred embodiment of the present invention, as illustrated in FIG. 6, perforations 130 are provided in the portion of the closure plate 86 located forwardly of the outlet 44 to collect any matter which may be drawn along the upper surface of the closure plate 86 as it is forced away from the outlet 44 and thus avoid interference with the sliding movement of the closure plate 86. Since such clinging material otherwise would be deposited on the bottom surface of the partition plate 34 along the guideway port 48 located forwardly of the outlet 44, as the closure plate 86 is moved back toward its closed position beneath the outlet 44, this material deposited on the bottom surface of the partition plate 34 is then free to fall through the perforations 130 to the bottom surface of the guideway port 48 and not collect or interfere with the movement of the closure plate 86.

As can be seen from the foregoing, due to the close interrelation between the upwardly projecting flanges 68 of the cup portion 60 of the scoop 14, the lower end of the hopper 40, the outlet 44, and the closure plate 86, spillage of material as well as potential interruption of the operation of the device is prevented. In addition, the closure plate 86 will have returned to its closed position before the tapered end 70 of the scoop has cleared the discharge outlet; and under continued rearward movement the upper edge of the tapered end will remove and collect any excess particles left between the closure plate 86 and outlet 44. Furthermore, the amount of material dispensed on each occasion is not dependent upon the closure mechanism but rather on the adjustable bottom of the measuring scoop. This is combination with the scraper block 82 and the above-mentioned close interrelationship between the scoop 14, the closure plate 86 and the outlet 44, enables accurately measured amounts of variable quantities to be removed from the container 12 without any significant spillage.

It will be understood that the invention may be embodied in other specific forms without departing from the spirit or central characteristics thereof. The present embodiment, therefore, are to be considered in all respects as illustrative and not restrictive, and the invention is not be be limited to the details given herein but may be modified within the scope of the appended claims.

What is claimed is:

1. A dispensing and measuring device comprising a container having a discharge outlet therein, a guideway port extending beneath said outlet, closing means adapted for sliding movement within said guideway port along a path immediately beneath said outlet for closing said outlet, the portion of said closing means disposed forwardly of said outlet when said closing means is in its closed position having a plurality of perforations therein, guide means for supporting and slidably guiding said closing means along said path immediately beneath said outlet, bias means for moving said closing means to and normally retaining said closing means in a closed position beneath said outlet, a measuring receptacle adapted for insertion into and slidable movement within said guideway port along a path immediately below said closing means, a plurality of longitudinal ribs extending upwardly from a lower portion of said guideway port and configured to maintain an upper edge of said measuring receptacle in closely spaced relation below said discharge outlet, said ribs defining longitudinal channels in the lower portion of said guideway port, and a shoulder member interposed between said receptacle and said closing means, so as to permit engagement of said receptacle with said closing means to move said closing means away from said outlet as said receptacle moves forwardly through said guideway port thereby opening said outlet, said bias means tending to retract said closing means along said guideway port to close said outlet when said receptacle moves rearwardly along said guideway port.

2. The dispensing and measuring device as described in claim 1, wherein said device further includes means for limiting the forward movement of said receptacle within said guideway port when said outlet is completely open with said receptacle disposed therebelow, said receptacle receiving the contents of said container discharged through said open outlet.

3. The dispensing and measuring device as described in claim 1 including a scraper member disposed rearwardly of said discharge outlet and having a forward edge adjacent a rearward edge of said discharge outlet, and wherein said shoulder member and said guide means for supporting and slidably guiding said receptacle along said guideway port are adapted to position said receptacle immediately beneath any open portion of said outlet as said outlet is being opened or closed thereby substantially preventing any spillage of the contents of said container, the upper edge of said receptacle passing immediately beneath said scraper member when said receptacle moves forwardly and rearwardly along said guideway port.

4. The dispensing and measuring device as described in claim 1, wherein said closing means comprises a closure plate adapted for longitudinal sliding movement along said path immediately below said outlet to selectively close and seal said outlet thereby preventing discharge of the contents of said container through said outlet, and a slide member connected to said closure plate and engaged with said means for supporting and slidably guiding said closing means along said path immediately beneath said outlet, said shoulder member being secured to the underside of said closure plate directly below said outlet when said closing means is in its closed position.

5. The dispensing and measuring device as described in claim 4, wherein said closure plate extends longitudinally beyond said outlet along said guideway port when said closing means is in its closed position.

6. The dispensing and measuring device as described in claim 4, wherein said means for supporting and slidably guiding said closing means along said path immediately beneath said outlet comprises substantially parallel, spaced-apart closure plate guide rails disposed longitudinally along said guideway port on either side of said outlet, said slide member being engaged with said closure plate guide rails for sliding movement along the length thereof.

7. The dispensing and measuring device as described in claim 1, wherein said bias means comprises return springs, each spring being anchored at one end to said container and secured at its other end of movement with said closing means, said springs retaining said closing means in its closed position and urging said closing means to its closed position when said closing means has been moved therefrom by the forward movement of said receptacle along said guideway port.

8. A dispensing and measuring device comprising a container having a downwardly discharging outlet therein, a guideway port having one open end and extending through said container beneath said outlet, a closure plate disposed within said guideway port along a path immediately beneath said outlet and adapted to selectively open and close said outlet, a slide member connected to the underside of said closure plate, a first pair of substantially parallel, spaced-apart closure plate guide rails disposed longitudinally along the upper surface of said guideway port on either side of said outlet and a second pair of substantially parallel, spaced-apart closure plate guide rails disposed longitudinally along the upper surface of said guideway port forwardly of said outlet, said slide member being engaged with said first pair of closure plate guide rails for sliding movement along the length thereof and said closure plate being engaged by said second pair of closure plate guide rails, an angular shoulder member projecting downwardly from the underside of said closure plate, resilient means for moving said closure plate to and retaining said closure plate in its closed position immediately beneath said outlet, a variable volume measuring scoop adapted for insertion into and longitudinal movement within said guideway port along path immediately below said closure plate, the forward end of said scoop being sized and shaped for abutting engagement with said angular shoulder member, a scraper member adjacent said outlet and extending laterally across said guideway port, said scraper member positioned in closely spaced relation to the upper edge of said scoop when said scoop is inserted in and moved within said guideway port, means for supporting and slidably guiding said scoop along said guideway port to permit engagement of said scoop with said shoulder member to slide said closure plate away from said outlet as said scoop moves forwardly through said guideway port thereby opening said outlet, said resilient means tending to retract said closure plate along said guideway port to close said outlet as said scoop moves rearwardly along said guideway port and a guideway stop disposed within said guideway port for halting the forward movement of said scoop within said guideway port when said outlet is completely open with said scoop disposed therebelow, said scoop receiving the contents of said container discharged through said outlet.

9. The dispensing and measuring device as defined in claim 8 including a longitudinal rib extending upwardly from the lower surface of said guideway port and supporting said scoop when said scoop is inserted in said guideway port, and wherein said resilient means comprises spiral springs, each said spring being anchored at one end to said container and secured at its other end for simultaneous movement with said closure plate along said guideway port, said springs retaining said closure plate in its closed position beneath said outlet and tending to move said closure plate to its closed position when said closure plate has been moved therefrom by the forward movement of said scoop with said guideway port.

10. The dispensing and measuring device as defined in claim 8, wherein the bottom of said scoop is adjustable to permit the volume of said scoop to be selectively varied, thereby enabling the removal of the contents from said container by said scoop in preselected measured amounts.

11. The dispensing and measuring device according to claim 8, wherein said means for supporting and slidably guiding said scoop along said guideway port comprises guideway walls disposed longitudinally along the sides of said guideway port, substantially parallel, spaced-apart upper guide rails disposed longitudinally along said guideway port on either side of said outlet between the forward end of said outlet and the open end of said guideway port, and upper guide block disposed between said upper guide rails and between the rearward end of said outlet and said guideway port opening, said block being adapted to form a part of the rearward end of said outlet, and vertical slide flanges projecting upwardly from the upper longitudinal edges of the sides of said scoop for longitudinal sliding engagement along the outer edges of said upper guide rails.

12. A dispensing and measuring device comprising a container, a hopper disposed within said container and having a downwardly discharging outlet therein, a guideway port having one open end and extending transversely through said container beneath said hopper outlet, a spring-biased closure plate disposed within said guideway port along a path immediately beneath said outlet and adapted for selectively opening and closing said outlet, a slide member connected to the underside of said closure plate, spaced-apart closure plate guide rails for supporting and slidably guiding said closure plate along said path immediately beneath said outlet and disposed longitudinally along the upper surface of said guideway port on either side of said outlet, said slide member being engaged with said closure plate guide rails for sliding movement along the length thereof, a V-shaped shoulder member projecting downwardly from the underside of said closure plate, resilient means for moving said closure plate to and retaining said closure plate in its closed position immediately beneath said outlet, a variable volume measuring scoop having an open top and adapted for insertion into and longitudinal movement within said guideway port along a path immediately below said closure plate, the forward end of said scoop being tapered for abutting engagement with said V-shaped shoulder member, said scoop having vertical slide flanges projecting upwardly from the upper longitudinal edges of the sides of said scoop, and spaced-apart scoop guide rails disposed longitudinally along the upper surface of said guideway port on either side of said outlet between said outlet and said guideway port opening, said scoop vertical slide flanges slidably engaging the outer longitudinal edges of said scoop guide rails to permit engagement of said scoop with said shoulder member to slide said closure plate away from said outlet as said scoop moves forwardly through said guideway port thereby opening said outlet, said resilient means tending to retract said closure plate along said guideway port to close said outlet as said scoop moves rearwardly along said guideway port.

13. The dispensing and measuring device as defined in claim 12, wherein said container includes a partition plate dividing said container into an upper chamber which contains said hopper and a lower chamber through which said guideway port extends, said hopper having inclined side panels disposed within said upper chamber and converging at said outlet in said partition plate, and a block disposed longitudinally along the upper surface of said guideway port between said guideway port opening and the rearward edge of said outlet to form a downwardly projecting abutment at the rearward edge of said outlet.

14. The dispensing and measuring device as defined in claim 12, wherein the portion of said closure plate disposed forwardly of said outlet, when said closure plate is in its closed position, includes a plurality of perforations.

15. A dispensing and measuring device, comprising a container having a discharge outlet therein, a guideway port extending beneath said outlet, closing means adapted for sliding movement within said guideway port along a path immediately beneath said outlet for closing said outlet, guide means for supporting and slidably guiding said closing means along said path immediately beneath said outlet, bias means for moving said closing means to and normally retaining said closing means in a closed position beneath said outlet, a measuring receptacle in the shape of an open-topped scoop having a tapered forward end and an adjustable bottom adapted for insertion into and slidable movement within said guideway port along a path immediately below said closing means, a plurality of longitudinal ribs extending upwardly from a lower portion of said guideway port and configured to maintain an upper edge of said measuring receptacle in closely spaced relation below said discharge outlet, said ribs defining longitudinal channels in the lower portion of said guideway port, and a V-shaped shoulder member interposed between said receptacle and said closing means and projecting downwardly from said closing means, so as to permit engagement of said tapered forward end of said receptacle with said closing means to move said closing means away from said outlet as said receptacle moves forwardly through said guideway port thereby opening said outlet, said bias means tending to retract said closing means along said guideway port to close said outlet when said receptacle moves rearwardly along said guideway port.

* * * * *

UNITED STATES PATENT AND TRADEMARK OFFICE
CERTIFICATE OF CORRECTION

PATENT NO. : 4,166,487
DATED : September 4, 1979
INVENTOR(S) : Henry J. Spies

It is certified that error appears in the above—identified patent and that said Letters Patent is hereby corrected as shown below:

Column 5, line 46, cancel "6 and 7" and substitute -- 4 and 6 --.
Column 6, line 26, cancel "is" and substitute -- to --.
Column 6, line 47, cancel "outler" and substitute -- outlet --.
Column 7, line 44, cancel "is" and substitute -- in --.

Claim 7, Column 9, line 4, cancel "of" and substitute -- for --.
Claim 11, Column 10, line 17, cancel "and" and substitute -- an --.

Signed and Sealed this

First Day of September 1981

[SEAL]

*Attest:*

*Attesting Officer*

GERALD J. MOSSINGHOFF

*Commissioner of Patents and Trademarks*